US008837365B2

(12) United States Patent
Bhatt et al.

(10) Patent No.: US 8,837,365 B2
(45) Date of Patent: Sep. 16, 2014

(54) METHOD AND SYSTEM FOR SECURELY ROUTING TRAFFIC ON X2 INTERFACE IN A 3GPP NETWORK

(75) Inventors: Yogesh B. Bhatt, Santa Clara, CA (US); Mukesh Garg, Cupertino, CA (US)

(73) Assignee: Stoke, Inc., Santa Clara, CA (US)

( * ) Notice: Subject to any disclaimer, the term of this patent is extended or adjusted under 35 U.S.C. 154(b) by 69 days.

(21) Appl. No.: 13/309,332

(22) Filed: Dec. 1, 2011

(65) Prior Publication Data

US 2013/0051316 A1 Feb. 28, 2013

Related U.S. Application Data

(60) Provisional application No. 61/528,010, filed on Aug. 26, 2011.

(51) Int. Cl.
*H04W 4/00* (2009.01)
*H04W 92/20* (2009.01)
*H04W 12/02* (2009.01)
*H04L 29/06* (2006.01)

(52) U.S. Cl.
CPC .............. *H04W 92/20* (2013.01); *H04W 12/02* (2013.01); *H04L 63/0428* (2013.01)
USPC ........... 370/328; 370/351; 370/352; 370/353; 370/398

(58) Field of Classification Search
USPC .................. 370/331, 329, 312; 380/270, 248; 455/411
See application file for complete search history.

(56) References Cited

U.S. PATENT DOCUMENTS

| 2010/0091734 A1* | 4/2010 | Park et al. ...................... 370/331 |
| 2010/0097992 A1* | 4/2010 | Velev et al. .................... 370/328 |
| 2012/0188984 A1* | 7/2012 | Takahashi et al. ............ 370/331 |

OTHER PUBLICATIONS

Cheng et al. "A Security Architecture for the Internet Protocol", IBM Systems Journal, vol. 37, No. 1, 1998, retrieved from: http://www.princeton.edu/~rblee/ELE572Papers/Fall04Readings/pau-cheng.pdf.*
Cheng et al. "A Security Architecture for the Internet Protocol", IBM Systems Journal, vol. 37, No. 1, 1998, retrieved from: http://www.princeton.edu/~rblee/ELE572Papers/Fall04Readings/pau-cheng.pdf. As accessed on Apr. 25, 2013.*

* cited by examiner

*Primary Examiner* — Andrew Lai
*Assistant Examiner* — Jamaal Henson
(74) *Attorney, Agent, or Firm* — Blakely, Sokoloff, Taylor & Zafman LLP

(57) ABSTRACT

A network element is configured to receive a first packet from a first eNodeB (eNB) of the packet network via a first secured X2 link. The network element decrypts the first packet to reveal a second packet encapsulated within the first packet. The network element determines a second secured X2 link associated with a second eNB as an intended recipient of the second packet. The network element encrypts the second packet to generate a third packet and transmits the third packet to the second eNB via the second secured X2 link. The network is coupled to various eNBs of the packet network via various secured X2 links, respectively.

18 Claims, 5 Drawing Sheets

METHOD AND SYSTEM FOR SECURELY ROUTING TRAFFIC ON X2 INTERFACE IN A 3GPP NETWORK

RELATED APPLICATIONS

This application also claims the benefit of U.S. Provisional Patent Application Ser. No. 61/528,010, filed, Aug. 26, 2011, which is incorporated by reference herein in its entirety.

FIELD OF THE INVENTION

The present invention relates generally to Long Term Evolution (LTE/4G) mobile networks. More particularly, this invention relates to securely route traffic on the X2 interface in a third generation partnership project (3GPP) LTE network.

BACKGROUND

The LTE (Long Term Evolution) network is evolution of GPRS or universal mobile telecommunications system (UMTS) standard to provide very high speed packet switched data services. Packet-switched data services are used for transmitting chunks of data or for data transfers of an intermittent or bursty nature. Typical applications for 3GPP packet service include Internet browsing, wireless e-mail, audio/video media applications and credit card processing, etc. As the adoption of mobile broadband increases, the need for a higher capacity backhaul goes up. Evolved high speed packet access (HSPA+) already provides a bandwidth in tens of Mbps per user and adding Femto services to the third-generation (3G) offerings will provide users access to more and more broadband data services. LTE will provide very high speed data access—such as 25-100 Mbps per UE.

FIG. 1 is a block diagram illustrating a typical LTE network architecture. Referring to FIG. 1, user equipments (UEs) 101-103 are communicatively coupled to a LTE core network 110 via a respective access network or cell. For example, UE 101 is coupled to the core network 110 via eNodeB (eNB) 104 such as an IP-BTS access network. UE 102 is coupled to the core network 110 via eNB 105 such as a Femtocell (e.g., home eNode B or HeNB). UE 103 is coupled to the core network 110 via eNB 106 such as a long term evolution (LTE) access network (e.g., evolved UMTS terrestrial RAN (E-UTRAN) node B or eNB).

eNodeB (evolved NodeB) is a term used in LTE (Long Term Evolution—aka 4G) similar to NodeB in UMTS (Universal Mobile Telecommunications System) equivalent to the BTS (base transceiver station) description used in GSM. It is the hardware that is connected to the mobile phone network that communicates directly with mobile handsets. In contrast with UMTS base stations, eNodeB uses OFDMA as the air interface technology. As in all cellular systems, such as UMTS and GSM, the eNodeB contains radio frequency transmitter(s) and the receiver(s) used to communicate directly with mobile devices, which move freely around it. In this type of cellular network, the mobile devices cannot communicate directly with each other but have to communicate with the eNodeB. Each eNodeB serves one or more E-UTRAN cells. eNodeBs can be interconnected with each other by means of X2 interface. A home eNB (HeNB) connects to an existing residential broadband service. An HeNB provides LTE radio coverage for LTE handsets within a home.

In order to access other networks such as Internet and/or operator services node, UEs 101-103 have to go through core network 110. Typically, LTE core network 110 includes a serving gateway (S-GW) 107 and a gateway packet data network (PDN) P-GW 108. These S-GW and P-GW relay communications between a user terminal (e.g., source mobile station) and a destination. Note that typically, there may be multiple S-GWs associated with a P-GW, multiple access networks associated with an S-GW, and multiple UEs associated with an access network in a hierarchical structure (not shown).

Typically, each of eNBs 104-106 communicates with core network 110 via S1 links 111-113, respectively. Each of eNBs 104-106 communicates with rest of the eNBs 104-106 via a specific X2 interface such as X2 links 114-116, respectively. Thus, for every two eNBs there is an X2 link, which forms a full mesh amongst eNBs in a particular domain. Note that although only three eNBs are shown for the purpose of illustration, more eNBs may exist, which exponentially increases density of the mesh amongst the eNBs. Depending on the deployment scenario, the X2 interface traffic between two eNBs can be secured or unsecured. If an eNB needs to send secured X2 traffic to the rest of the eNBs, that eNB has to maintain many secure connections with each of the rest of eNBs, or vice versa (e.g., a full mesh). As more and more eNBs (or HeNB) are involved, such a configuration becomes complicated and difficult to manage and very costly.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, an X2 switching network element (also referred to as an X2 switch or a secure X2 switch) is utilized to coordinate X2 interface traffic (also simply referred to as X2 traffic) amongst the eNBs of a particular network domain. In one embodiment, one or more X2 switches may be placed within a predetermined proximity of the eNBs associated with a network domain (e.g., a metro-cell) to logically or geographically couple with all or most of the eNBs within the network domain. Each X2 switch maintains a specific secured X2 link having a secured tunnel, such as a static IPSec tunnel, with each of the eNBs in the domain. When a first eNB attempts to send a packet on X2 interface (e.g., X2 control or X2 user traffic) to a second eNB, the first eNB is configured to encrypt or encapsulate the X2 packet in another packet and tunnel the encrypted X2 packet to the X2 switch via a first secured tunnel or link associated with the first eNB. In response, the X2 switch is configured to de-tunnel the X2 packet from the first secured X2 link and re-tunnel the X2 packet to the second eNB via a second secured tunnel or link associated with the second eNB. As a result, each of the eNBs in the domain does not have to maintain multiple secured tunnels with each of the remaining eNBs in the domain; rather, it only needs to maintain one secured tunnel with the X2 switch.

Figure 1:
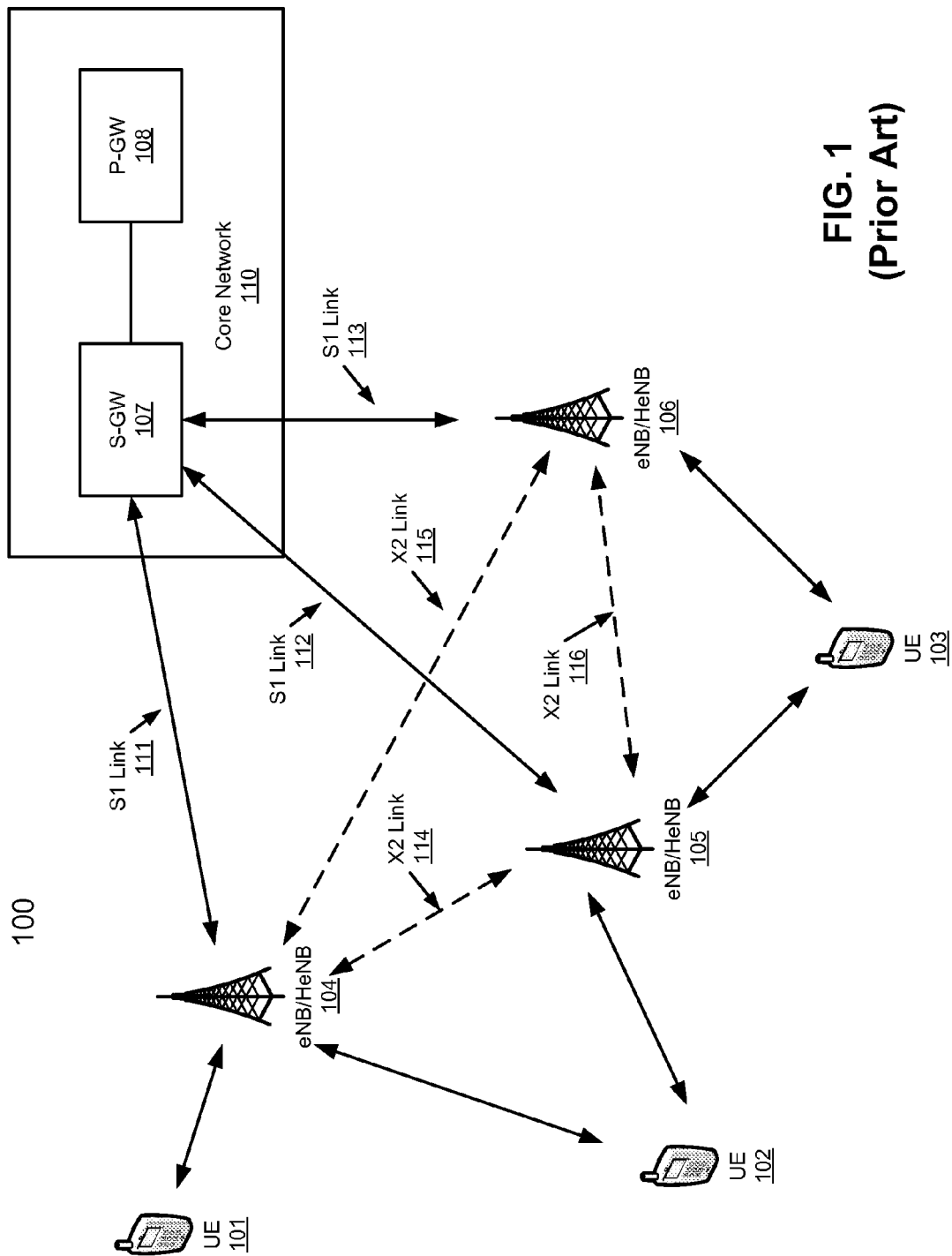
FIG. 1 is a block diagram illustrating typical 3GPP LTE packet architecture.
Figure 2:
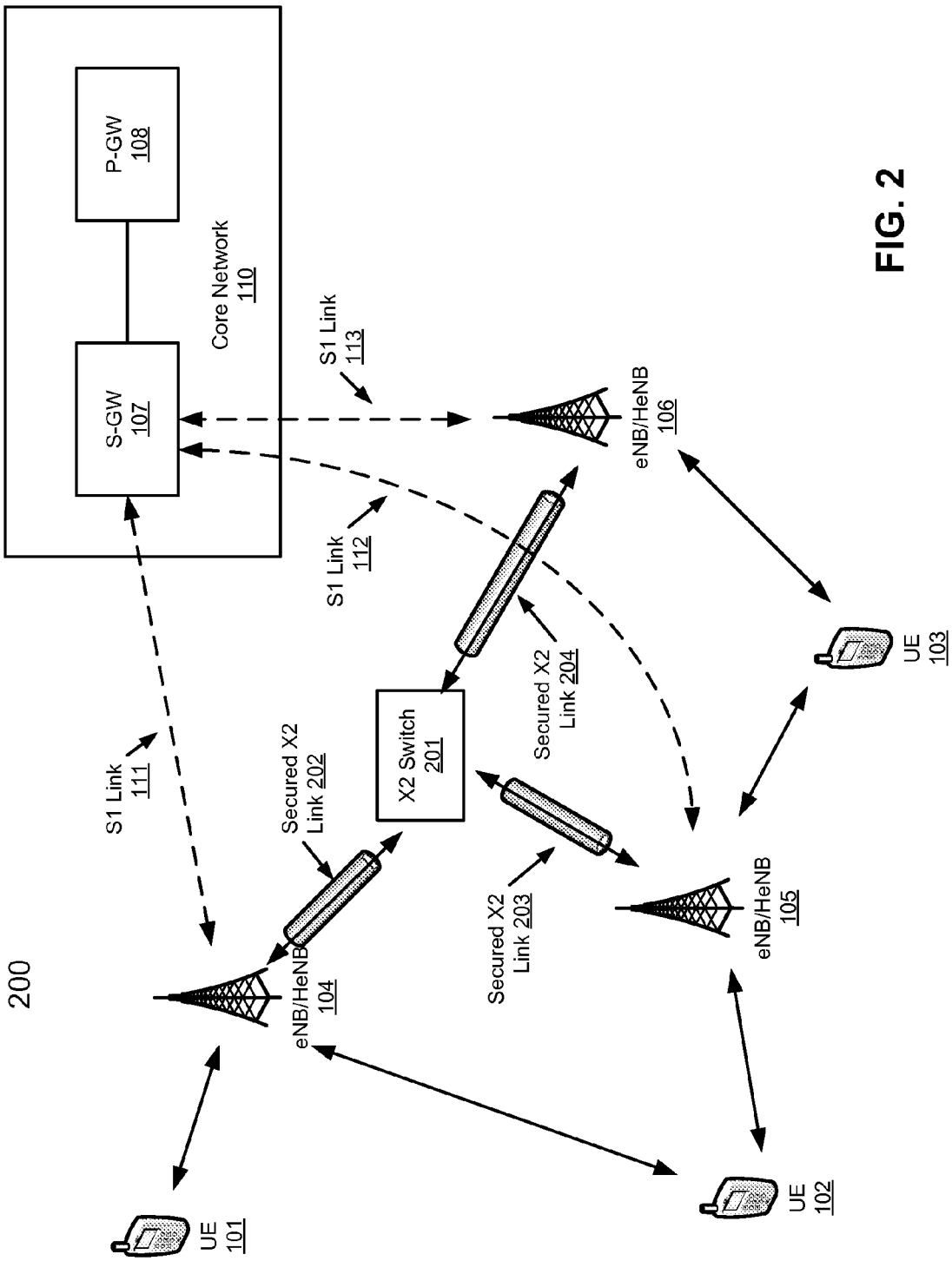
FIG. 2 is a block diagram illustrating a 3GPP packet system according to one embodiment.

FIG. 2 is a block diagram illustrating a network configuration according to one embodiment of the invention. Referring to FIG. 2, similar to the configuration as shown in FIG. 1, user equipments (UEs) 101-103 are communicatively coupled to a LTE core network 110 via eNBs 104-106, respectively. A UE can concurrently access multiple eNBs, for example, during roaming. Any of eNBs 104-106 can represent a variety of access networks or basestations, such as, for example, an IP-BTS access network, a femto cell, a long term evolution (LTE) access network (e.g., evolved UMTS terrestrial RAN (E-UTRAN) eNode B or eNB), or a conventional radio access network (RAN), etc.

A femto cell is a small cellular basestation, typically designed for use in a home or small business. It connects the service provider's network via broadband such as digital subscriber line (DSL) or cable. A femto cell allows service providers to extend service coverage indoors, especially where access would otherwise be limited or unavailable. The femto cell incorporates the functionality of a typical basestation but extends it to allow a simpler, self contained deployment.

Core network 110 may be a fourth-generation (4G) packet core network, or a combination of both (4G & 3G). Typically, a packet core network includes a serving GPRS support node (SGSN) or a serving gateway (S-GW) 107 and a gateway GPRS support node (GGSN) or a packet data network (PDN) P-GW 108. These S-GW 107 and PDN/P-GW 108 relay communications between a user terminal (e.g., source mobile station) and a destination (e.g., operator services or the Internet). Note that typically, there may be multiple S-GWs associated with a PDN/P-GW, multiple access networks associated with a S-GW, and multiple UEs associated with an access network in a hierarchical structure (not shown).

According to one embodiment, system 200 further includes one or more X2 switches 201 configured to coordinate X2 traffic amongst eNBs 104-106. For each of eNBs 104-106, X2 switch 201 maintains a secured X2 link with a secured tunnel such as secured X2 links 202-204, respectively, to exchange X2 traffic with the respective eNB. When a first eNB (e.g., eNB 104) attempts to send an X2 packet (e.g., X2 control or X2 user traffic) to a second eNB (e.g., eNB 106), the first eNB is configured to encrypt or encapsulate the X2 packet in another packet and tunnel the encrypted X2 packet to X2 switch 201 via a first secured tunnel or link associated with the first eNB (e.g., secured X2 link 202). In response, X2 switch 201 is configured to de-tunnel the X2 packet from the first secured X2 link and re-tunnel the X2 packet to the second eNB via a second secured tunnel or link associated with the second eNB (e.g., secured X2 link 204). As a result, each of eNBs 104-106 in the domain does not have to maintain multiple secured tunnels with each of the remaining eNBs in the domain; rather, it only needs to maintain one secured tunnel with X2 switch 201.

In one embodiment, each of secured X2 links 202-204 includes an IPSec compatible tunnel, such as a static IPSec tunnel. IPSec can be implemented in a host-to-host transport mode, as well as in a network tunnel mode. In transport mode, only the payload (e.g., the data being transferred) of an IP packet is encrypted and/or authenticated. The routing is intact, since the IP header is neither modified nor encrypted. Transport mode is used for host-to-host communications. In tunnel mode, the entire IP packet (e.g., data and IP header) is encrypted and/or authenticated. It is then encapsulated into a new IP packet with a new IP header (e.g., outer IP header). Tunnel mode is used for network-to-network communications, host-to-network communications, and host-to-host communications.

X2 switch 201 may be implemented as part of core network 110 or outside of core network 110. In one embodiment, X2 switch 201 may be strategically or geographically distributed close to eNBs 104-106. For example, X2 switch 201 may be implemented as part of mobile telephone switching offices (MTSO)/IP point of presence (POP) of a carrier. Alternatively, X2 switch 201 may be implemented as part of a regional data center (RDC) of the carrier. Note that one or more X2 switches may be associated with multiple eNBs within a preconfigured network domain (e.g., metro-cell). Also note that any of eNBs 104-106 may represent one or more eNBs or a cluster of eNBs (e.g., a super cell or super eNB). X2 switch 201 may be a SSX™ compatible session exchange device available from Stoke®, Inc. of Santa Clara, Calif.

Figure 3:
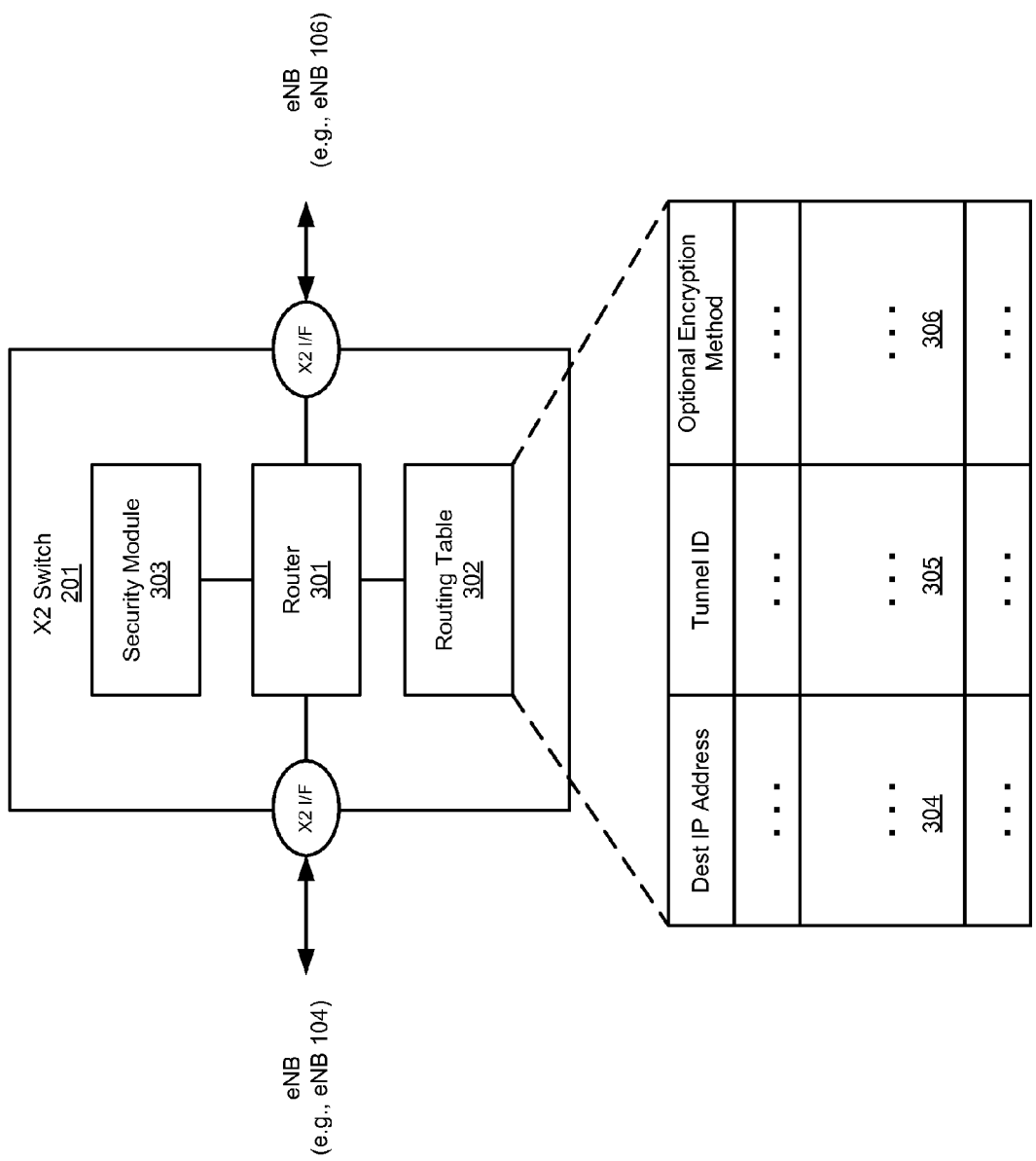
FIG. 3 is a block diagram illustrating an example of an X2 switch according to one embodiment of the invention.

FIG. 3 is a block diagram illustrating an example of an X2 switch according to one embodiment of the invention. Referring to FIG. 3, X2 switch 201 includes, but it not limited to, router 301, routing table 302, and security module 303. Router 301 is configured to route X2 traffic amongst eNBs such as eNBs 104-106 based on routing table 302. Security module 303 is configured to encrypt and/or decrypt secured X2 traffic optionally based on routing table 302. Routing table 302 includes sufficient information to allow router 301 and/or security module 303 to make proper routing and/or security decisions. In one embodiment, routing table 302 includes multiple entries. Each entry includes field 304 to store a destination IP address associated with an eNB, field 305 to store a tunnel identifier (ID) associated with the destination IP address, and field 306 to optionally store an encryption/decryption method that is agreed upon between X2 switch 201 and the corresponding eNB associated with the destination IP address stored in field 305. The entries of routing table 302 may be indexed based on the IP addresses stored in field 304.

According to one embodiment, referring to FIGS. 2 and 3, when a first eNB (e.g., eNB 104) attempts sending a first packet as an X2 packet (e.g., X2 control or X2 user data) to a second eNB, the first eNB is configured to encrypt the first packet using a predetermined encryption method that is agreed upon between the first eNB and X2 switch 201. The first packet may have a source IP address of a UE that originated the first packet (e.g., UE 101). The first eNB is then to encapsulate the encrypted first packet as part of a payload of a second packet. The second packet may have a source IP address of the first eNB and a destination IP address of X2 switch 201. The second packet is then transmitted to X2 switch 201 via the corresponding secured X2 link (e.g., secured X2 link 202).

When X2 switch 201 receives the second packet, according to one embodiment, security module 303 of X2 switch 201 decrypts the second packet using a decryption method agreed with the first eNB to reveal the original first packet. Based on the destination IP address of the first packet, router 301 is configured to perform a look up operation at routing table 302 to locate an entry corresponding to the destination IP address to identify a secured tunnel based on a tunnel ID stored in the associated field 305. Security module 303 is then encrypt the first packet and encapsulate the encrypted first packet in a third packet, where the third packet includes a source IP address of X2 switch 201 and a destination IP address of the second eNB. Router 301 then transmits the third packet to the second eNB via a second secured X2 link having a secured tunnel identified by the tunnel ID obtained from routing table 302.

Figure 4:
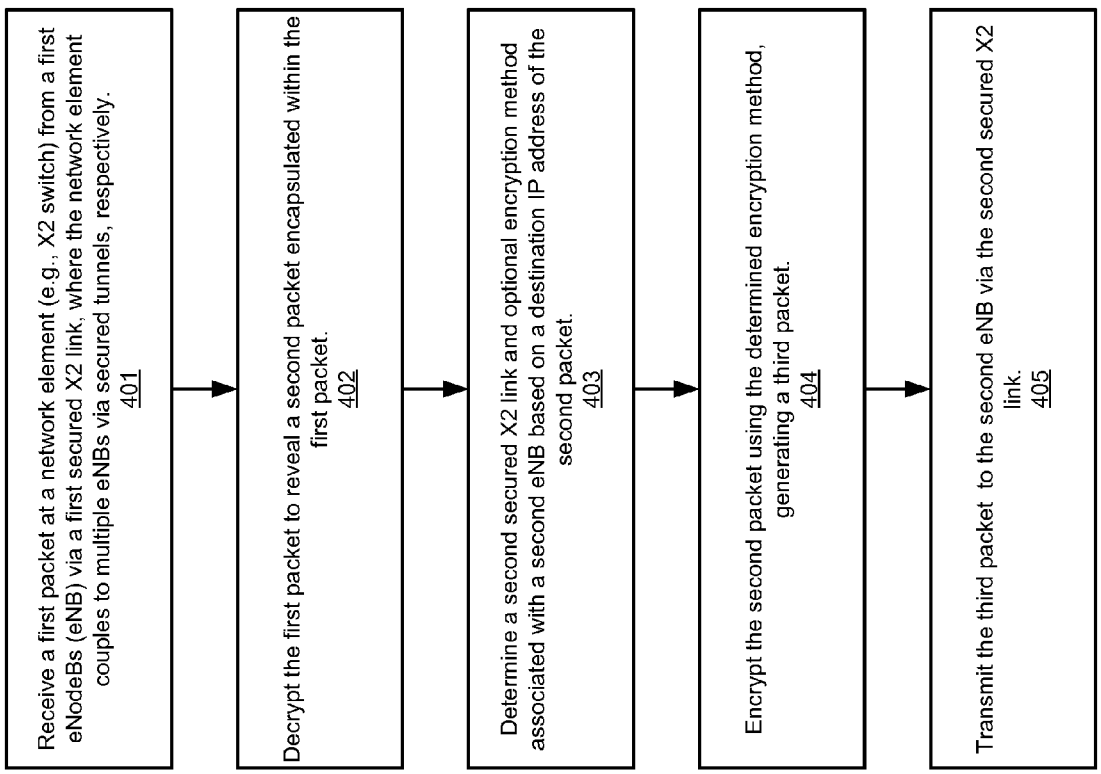
FIG. 4 is a flow diagram illustrating a method for processing X2 network traffic in a GPRS network according to one embodiment of the invention.

FIG. 4 is a flow diagram illustrating a method for processing X2 network traffic in a LTE network according to one embodiment of the invention. Note that method 400 may be performed by processing logic which may include software, firmware, hardware, or a combination thereof. For example, method 400 may be performed by X2 switch 201 of FIG. 2. Referring to FIG. 4, at block 401, a network element such as an X2 switch receives a first packet from a first eNB via a first secured X2 link. The network element couples to multiple eNBs of a particular network domain via secured X2 links, respectively. At block 402, the first packet is decrypted to reveal a second packet as part of the payload encapsulated within the first packet. The second packet is destined to a second eNB. At block 403, a second secured X2 link is determined and optional encryption method associated with the second eNB are determined. The second secured X2 link may be determined based on a destination IP address of the second packet. At block 404, the second packet is encrypted and encapsulated within a third packet. At block 405, the third packet is transmitted to the second eNB via the second secured X2 link.

Figure 5:
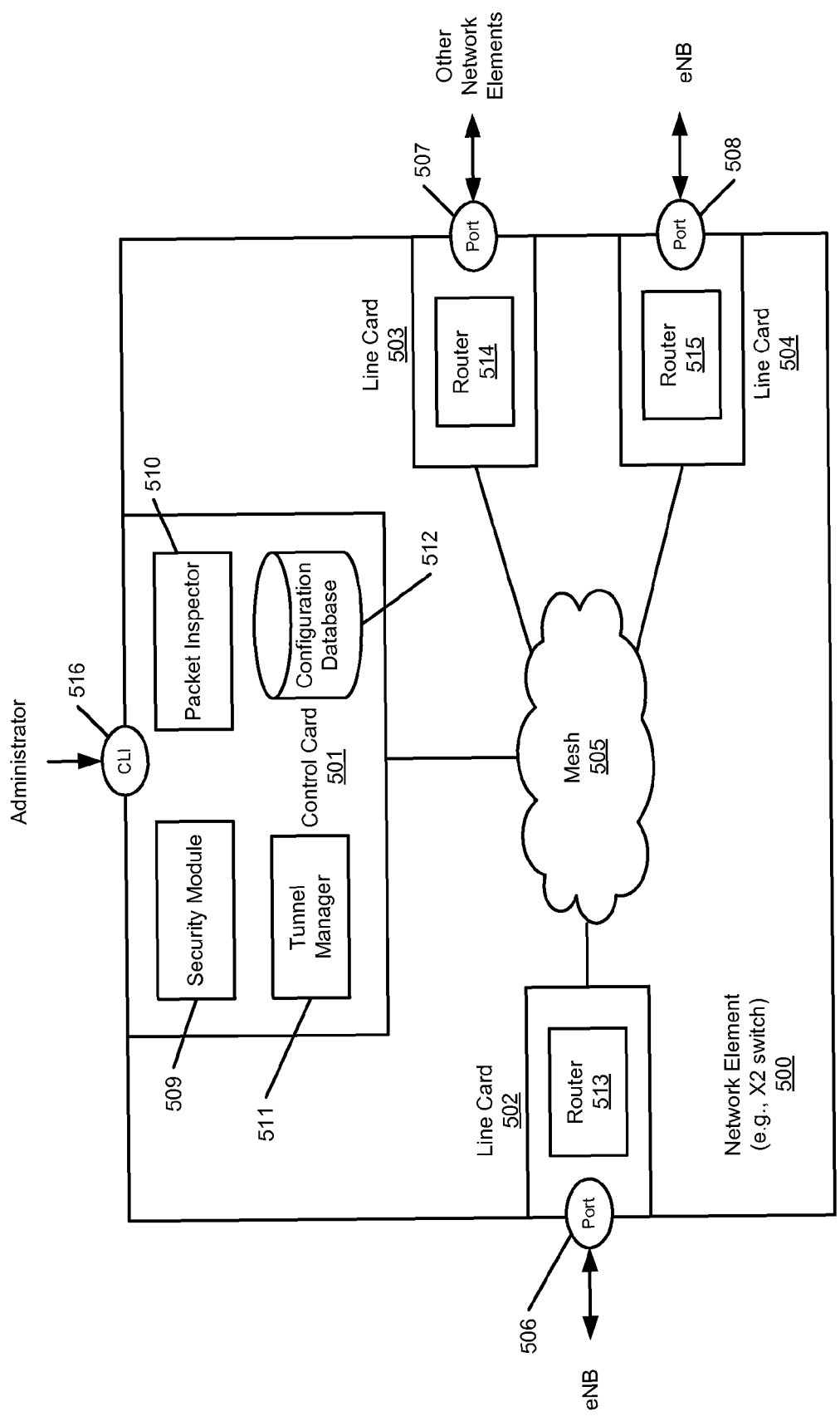
FIG. 5 is a block diagram illustrating a network element for routing X2 traffic according to one embodiment of the invention.

FIG. 5 is a block diagram illustrating a multi-function GW device according to one embodiment of the invention. For example, multi-function GW 500 may be implemented as part of X2 switch 201 of FIG. 2. Referring to FIG. 5, X2 switch 500 includes, but is not limited to, a control card 501 (also referred to as a control plane) communicatively coupled to one or more line cards 502-504 (also referred to as interface cards or user planes) over a mesh 505, which may be a mesh network, an interconnect, a bus, or a combination thereof. Each of the line cards 503-504 is associated with one or more interfaces (also referred to as ports), such as interfaces 506-508 respectively. Each line card includes routing functional block (e.g., blocks 513-515) to route packets via the corresponding interface according to a configuration (e.g., routing table) configured by control card 501.

According to one embodiment, control card 501 includes security module 509, packet inspector 510, tunnel manager 511, and a configuration database 512. In one embodiment, as discussed above, security module 509 is configured to handle a secure connection with a remote eNB and terminates the security connection (e.g., IPsec connection). The tunnel manager 511 may be responsible for managing secured tunnels coupling X2 switch 500 with remote eNBs, including establishing and terminating the secured tunnels, etc. Packet inspector 510 is configured to inspect packets received from one eNB and determine a secured X2 link to another eNB, as described above. Configuration database 512 is configured to store routing information and tunnel information, such as those as shown in FIG. 3. Configuration database 512 may be configured by an administrator via an administration interface such as command-line interface (CLI) 516. Note that some or all components as shown herein may be implemented in hardware, firmware, software, or a combination thereof.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for processing X2 traffic of a packet network, the method comprising:
   receiving, at a network element, a first packet from a first eNodeB (eNB/HeNB) of a packet network via a first secured X2 link;
   decrypting, by a security module of the network element, the first packet to reveal a second packet encapsulated within the first packet;
   accessing a routing table maintained within the network element, the routing table including a plurality entries, each of the entries corresponding to a destination IP address, a tunnel identifier (ID) identifying a secure tunnel and an encryption method associated with the destination IP address;
   determining, by a routing module of the network element, a second secured X2 link associated with a second eNB as an intended recipient of the second packet, including performing a lookup operation in the routing table to locate a first entry based on a destination IP address of the second packet to retrieve a tunnel ID for the second secured X2 link;
   encrypting, by the security module of the network element, the second packet to generate a third packet using an encryption method that is identified from the first entry of the routing table; and
   transmitting, by the routing module of the network element, the third packet to the second eNB via the second secured X2 link, wherein the network element is coupled to a plurality of eNBs of the packet network via a plurality of secured X2 links, respectively, including the first and second eNBs, and wherein each of the eNBs has to go through the network element in order to communicate with a remainder of the eNBs.

2. The method of claim 1, wherein each of the plurality of eNBs has to communicate with the network element via a respective secured X2 link in order to reach another one of the plurality of eNBs for the X2 traffic.

3. The method of claim 1, further comprising maintaining the secured X2 links between the network element and the plurality of eNBs.

4. The method of claim 3, wherein each of the plurality of secured X2 links comprises a static IPSec tunnel.

5. The method of claim 4, wherein the network element is designated X2 switching element that only performs switching X2 traffic.

6. The method of claim 5, wherein the network element is a separate node from a serving gateway of the packet network.

7. A network element for processing X2 traffic of a packet network, the network element comprising:
   an ingress interface to receive a first packet from a first eNodeB (eNB) of the packet network via a first secured X2 link;
   a routing table to store a plurality entries, each of the entries corresponding to a destination IP address, a tunnel identifier (ID) identifying a secure tunnel associated with the destination IP address, and an encryption method associated with the destination IP address;
   an encryption module coupled to the ingress interface to decrypt the first packet to reveal a second packet encapsulated within the first packet; and
   a router coupled to determine a second secured X2 link associated with a second eNB as an intended recipient of the second packet, including performing a lookup operation in the routing table to locate a first entry based on a destination IP address of the second packet to retrieve a tunnel ID for the second secured X2 link, wherein the encryption module is configured to encrypt the second packet to generate a third packet using an encryption method that is identified from the first entry of the routing table, and wherein the router is configured to transmit the third packet to the second eNB via the second secured X2 link, wherein the network element is coupled to a plurality of eNBs of the packet network via a plurality of secured X2 links, respectively, including the first and second eNBs, and wherein each of the eNBs has to go through the network element in order to communicate with a remainder of the eNBs.

8. The network element of claim 7, wherein each of the plurality of eNBs has to communicate with the network element via a respective secured X2 link in order to reach another one of the plurality of eNBs for the X2 traffic.

9. The network element of claim 7, further comprising a tunnel manager to maintaining the secured X2 links between the network element and the plurality of eNBs.

10. The network element of claim 9, wherein each of the plurality of secured X2 links comprises a static IPSec tunnel.

11. The network element of claim 10, wherein the network element is designated X2 switching element that only performs switching X2 traffic.

12. The network element of claim 11, wherein the network element is a separate node from a serving gateway of the packet network.

13. A non-transitory machine-readable storage medium having instructions stored therein, which when executed by a machine, cause the machine to perform a method for processing X2 traffic of a packet network, the method comprising:
   receiving, at the network element, a first packet from a first eNodeB (eNB) of the packet network via a first secured X2 link;
   decrypting, by a security module of the network element, the first packet to reveal a second packet encapsulated within the first packet;
   accessing a routing table maintained within the network element, the routing table including a plurality entries, each of the entries corresponding to a destination IP address, a tunnel identifier (ID) identifying a secure tunnel and an encryption method associated with the destination IP address;
   determining, by a routing module of the network element, a second secured X2 link associated with a second eNB as an intended recipient of the second packet including performing a lookup operation in the routing table to locate a first entry based on a destination IP address of the second packet to retrieve a tunnel ID for the second secured X2 link;
   encrypting, by the security module of the network element, the second packet to generate a third packet using an encryption method that is identified from the first entry of the routing table; and
   transmitting, by the routing module of the network element, the third packet to the second eNB via the second secured X2 link, wherein the network element is coupled to a plurality of eNBs of the packet network via a plurality of secured X2 links, respectively, including the first and second eNBs, and wherein each of the eNBs has to go through the network element in order to communicate with a remainder of the eNBs.

14. The machine-readable storage medium of claim 13, wherein each of the plurality of eNBs has to communicate with the network element via a respective secured X2 link in order to reach another one of the plurality of eNBs for the X2 traffic.

15. The machine-readable storage medium of claim 13, wherein the method further comprises maintaining the secured X2 links between the network element and the plurality of eNBs.

16. The machine-readable storage medium of claim 15, wherein each of the plurality of secured X2 links comprises a static IPSec tunnel.

17. The machine-readable storage medium of claim 16, wherein the network element is designated X2 switching element that only performs switching X2 traffic.

18. The machine-readable storage medium of claim 17, wherein the network element is a separate node from a serving gateway of the packet network.

* * * * *